J. W. ALLISON.
Corn-Planters.
No. 198,329.  Patented Dec. 18, 1877.
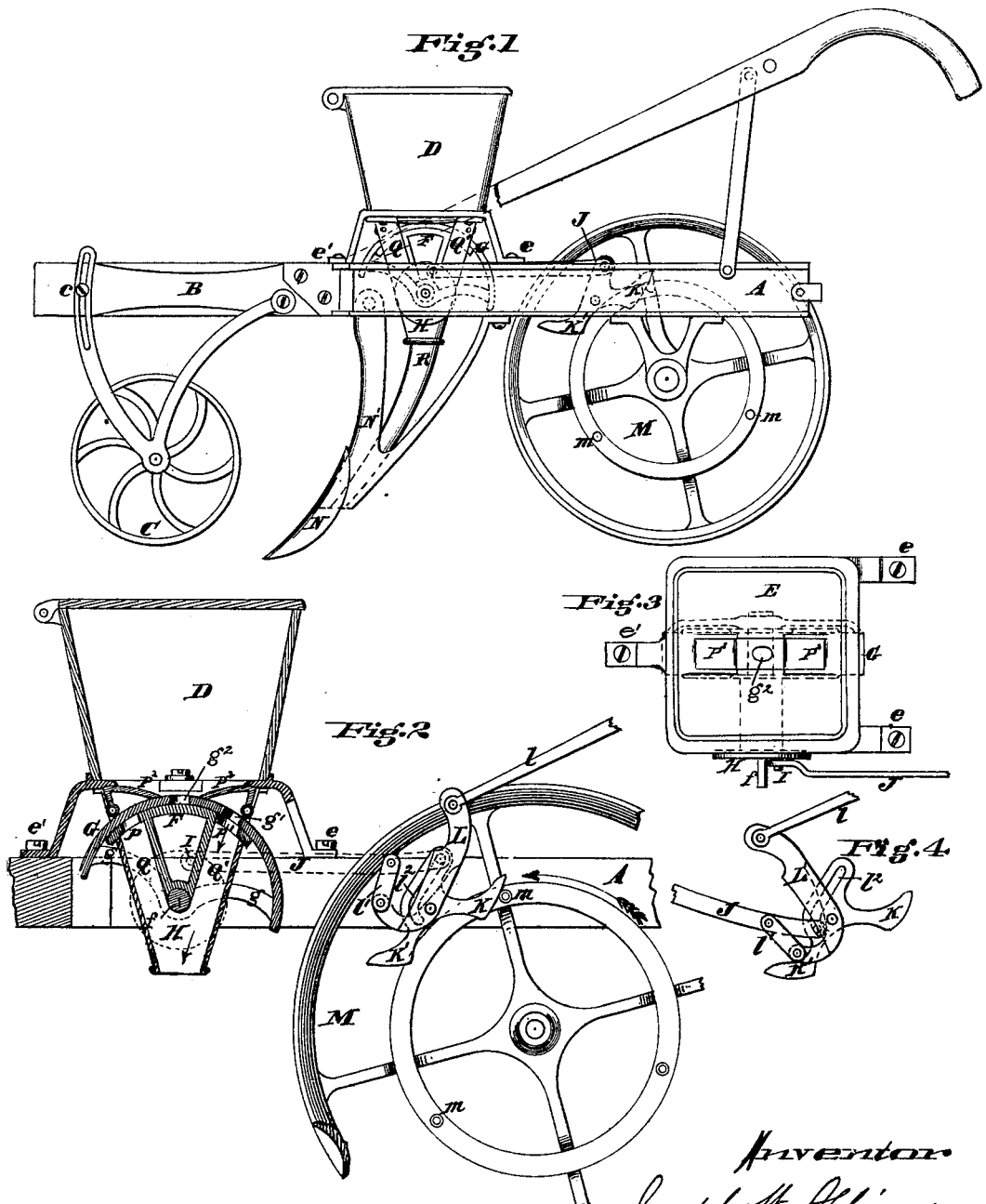

UNITED STATES PATENT OFFICE.

JOSEPH W. ALLISON, OF DAYTON, OHIO, ASSIGNOR TO THE FARMERS' FRIEND MANUFACTURING COMPANY, OF SAME PLACE.

IMPROVEMENT IN CORN-PLANTERS.

Specification forming part of Letters Patent No. 198,329, dated December 18, 1877; application filed August 14, 1877.

*To all whom it may concern:*

Be it known that I, JOSEPH W. ALLISON, of Dayton, in the county of Montgomery and State of Ohio, have invented certain new and useful Improvements in Corn - Planters, of which the following is a specification:

The invention relates to the seeding devices and the mechanism for operating the same, all of which will be fully described hereinafter.

Figure 1 is a side elevation; Fig. 2, a partial section; Fig. 3, a plan of the bottom of the seed-box with the hopper removed, and Fig. 4 a side view of the link-lever device for throwing the planter in or out of gear.

The frame is composed of two side pieces, A, which are connected in front to a center-piece, B. The caster-wheel C is adjustable, as shown at $c$. The seed-box D may be made in any known form, and is supported on a cast plate, E, secured to the two side pieces of the frame in the rear, as seen at $e$, and to the center-piece in front, as seen at $e'$. The upper side of the bottom plate E is concave, for the purpose of facilitating the descent of the seed to the cells of the carrier underneath, and in the center is provided with an opening, as shown in Fig. 3. Beneath the bottom plate are two sector-plates, F G, the former being stationary, with downward projections between the branching receivers of the grain-spout, the inner sides of which branches may be formed by said projections, and the latter is keyed to a shaft, $f$, by means of the cord $g$, so as to permit of its reciprocating with said shaft as a center.

H is a disk, rigidly attached to said shaft; but instead of a disk, a single arm or crank may be substituted. To this disk a rod, J, is pivoted at I, its other end being pivoted to an arm of the cam K K'. The tread of the ground-wheel M is preferably concave, so as the better to act as a coverer. On a disk or ring within the wheel are provided any number of pins, $m$, carrying anti-friction rollers. This wheel may be journaled in any suitable manner to the frame. The furrow-opener N and its support N' may be made in any of the ordinary forms. $P^2 P^2$ are hinged cut-offs, for regulating the quantity of seed carried to the discharge-openings P P$^1$ in the plate F.

The receiver of the seed from the dropper is made with two branches, Q Q', to the lower end of which is attached the usual seed-spout R. The cam K K' is pivoted to the side frame, and is provided with an arm, having a slot, $l^2$, straight at its outer end and curved opposite the pivot of the cam, within which slot a pin on the end of the rod J engages. L' is a crank-lever, pivoted on the same pin as the cam, and connected to the rod J by a link, $l^1$. The hand-rod $l$ may be of any form, but is preferably made with a slotted eye to engage a pin on the handles.

When it is desired to throw the machine out of gear, the rod $l$ is pushed forward, bringing the linked lever into the position shown in Fig. 4, where, owing to the curved slot, the cam can move without transmitting motion to the rod J. By drawing the hand-rod $l$ back the link-lever will be brought into the position shown in Fig. 2, and any movement of the cam will be transmitted to the feeding mechanism. When in operation in the position shown in Fig. 2, the seed will drop, as indicated by the arrows, and the cell in sector G, there shown in the center of the bottom of the seed-box, will fill with seed, and the ground-wheel M being moved in the direction of the arrow thereon, the pin $m$ strikes against the upper foot K of the pivoted cam, and moves it forward, a forward movement being transmitted to the sector-plate G until the full cell $g^2$ is carried over the discharge-opening P, when it discharges into the receiver Q, and, bringing the other cell to the center of the box to be filled, while the pin passes around the arc in the cam, and before passing out, returns the plate G to the position at which it started, where the load of seed brought back in cell $g^1$ will be discharged through the aperture P$^1$ into the conduit Q'.

It is obvious that the frequency with which the dropper-plate will be advanced will depend on the number or distance apart of the pins $m$, and that the return movement will depend on the distance that the contacting point of the lower foot K' of the cam is from its pivot, all of which can readily be regulated as desired.

It is also obvious that, instead of the operating mechanism shown, gearing or other devices might be used; but for cheapness and simplicity of construction, and regularity of movement, I prefer those shown.

It is also obvious that instead of the carrier G having two cells, it may be made with only one, in which case one of the conduits Q or Q' may be dispensed with.

What I therefore claim as new, and desire to secure by Letters Patent, is—

1. The double-action cam K K', operated by pins $m$, and connected to the seeding mechanism by rod J, substantially as and for the purpose specified.

2. The cam K K', provided with a curved slot, $l^2$, in combination with the linked lever L $l^1$ and rods J $l$, as and for the purpose specified.

In testimony whereof I have hereunto set my hand this 1st day of August, 1877.

J. W. ALLISON.

Witnesses:
   EDWARD BOYD,
   C. F. KNEISLY.